(12) United States Patent
Fu

(10) Patent No.: US 7,062,611 B2
(45) Date of Patent: Jun. 13, 2006

(54) DIRTY DATA PROTECTION FOR CACHE MEMORIES

(75) Inventor: Peter L. Fu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 387 days.

(21) Appl. No.: 10/071,014

(22) Filed: Feb. 7, 2002

(65) Prior Publication Data

US 2003/0149845 A1   Aug. 7, 2003

(51) Int. Cl.
*G06F 12/00* (2006.01)

(52) U.S. Cl. .................. 711/144; 711/143; 711/141
(58) Field of Classification Search ................ 711/143, 711/142, 144, 135, 134, 145, 133
See application file for complete search history.

(56) References Cited

U.S. PATENT DOCUMENTS 5,784,548 A * 7/1998 Liong et al. ................. 714/6
5,895,485 A * 4/1999 Loechel et al. ............. 711/119
6,574,709 B1 * 6/2003 Skazinski et al. ........... 711/119

OTHER PUBLICATIONS

Prior art summary in text of information Disclosure Statement transmittal submitted herewith.

* cited by examiner

*Primary Examiner*—Kimberly McLean
(74) *Attorney, Agent, or Firm*—Blakely, Sokoloff, Taylor & Zafman LLP

(57) ABSTRACT

A method is described for protecting dirty data in cache memories in a cost-effective manner. When an instruction to write data to a memory location is received, and that memory location is being cached, the data is written to a plurality of cache lines, which are referred to as duplicate cache lines. When the data is written back to memory, one of the duplicate cache lines is read. If the cache line is not corrupt, it is written back to the appropriate memory location and marked available. In one embodiment, if more duplicate cache lines exist, they are invalidated. In another embodiment, the other corresponding cache lines may be read for the highest confidence of reliability, and then marked clean or invalid.

15 Claims, 5 Drawing Sheets

DIRTY DATA PROTECTION FOR CACHE MEMORIES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Sun Microsystems, Inc., All Rights Reserved.

FIELD OF THE INVENTION

This invention relates to the field of cache memories, and to a method for protecting dirty data in cache memories.

BACKGROUND OF THE INVENTION

Computer memories take many different forms. The slowest memories, and usually the farthest from the central processing unit (CPU), are virtual memories, such as a disk drive. The fastest, and usually the nearest, memories, include main memory, registers, and caches. Of these, main memory is the slowest. Since caches are closer to the CPU, they allow information, such as recently used instructions and/or data, to be quickly accessed by the CPU. However, since caches are relatively expensive, and limited in size, the data that can be stored on a cache memory is limited.

Cache memories can be used to store read-only data and read/write data. When read-only data is cached, data that is read from a memory can be stored in a cache so that the next time the data needs to be read, it can be read from the faster cache rather than the slower system memory. An example of read-only data that is cache read from memory is instructions to a program. Read-only data is not prone to data loss since any data that gets corrupted in the cache can always be read from memory.

When read/write data is cached, data that is to be written to system memory can be written to the cache instead. The way that a cache handles writes is called the "write policy" of the cache. There are different write policies, two of which are described below.

A cache can be a write-back cache. When a write is made to system memory at a location that is currently cached, the new data is only written to the cache, and not to the system memory. Correspondingly, if another memory location needs to use the cache line where this data is stored, the currently stored data needs to be saved—i.e., written back—to the system memory so that the line can be used by the new memory location.

A cache can, alternatively, be a write-through cache. With this method, everytime a processor writes to a cached memory location, both the cache and the underlying memory location are updated. Cache written data may include any data, for example, a user-modified document.

While the write-through policy is more recoverable than the write back policy with respect to recovering from cache corruption, the write-back policy provides better performance at the risk of memory integrity, and are, therefore, prone to data loss due to cache errors.

In particular, where the write-back policy is utilized (i.e., new data that is to be written to a memory location that is cached is written to the cache and not to the memory location, and the new data is saved—written back to memory—when the cache line needs to be used by another memory location, for example), there is the risk that the cache may be corrupted before new data is saved.

Data in the cache which matches the data in a corresponding memory location is called clean data; and data in the cache which does not match the data in a corresponding memory location is called dirty data.

SUMMARY OF THE INVENTION

In one aspect of the invention, a method for maintaining dirty data is disclosed. This method comprises receiving a request to write data to a memory location that is cached, and then actually writing that data to a plurality of cache lines and marking those cache lines as dirty lines.

In another aspect of the invention, a method for saving, or writing back the dirty data to memory is disclosed. The method comprises reading dirty data from a cache line, and determining if the dirty data is corrupt. If it is not corrupt, then the line is marked available, and all dirty data lines corresponding to the read dirty data line are marked invalid.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
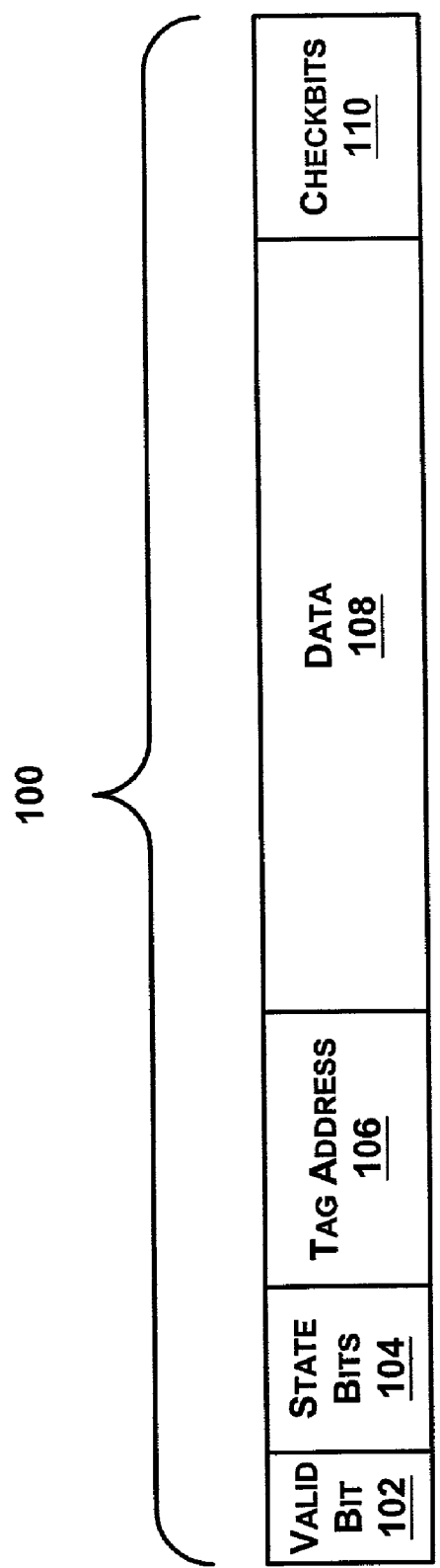
FIG. 1 is a block diagram illustrating a cache line in accordance with embodiments of the invention.

In one aspect of the invention, a cost-efficient method for protecting dirty data in cache memories is provided. When an instruction to write data to a memory location is received, and that memory location is a cached memory location, the data is instead written to a plurality of associated cache lines. When data is written back to memory, one of the associated cache lines is read. If the cache line is not corrupt, it is written back to the appropriate memory location and marked as clean. In one embodiment, if associated cache lines exist, they are invalidated. In another embodiment, the other associated cache lines may be read for the highest confidence of reliability, and then invalidated.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Since caches are highly volatile and prone to error, they typically have error detection capabilities. For example, to detect the corruption of data, parity checking may be used. In parity checking, a parity bit is used to check for errors in groups of transferred data bits. In parity checking, the number of ones in each successfully transmitted set of bits must be an odd or even number (depending on the implementation). Failure of a parity check results in an error indicating that the transmitted data is corrupt.

When data in a cache becomes corrupted, the data can be recovered using error correction or replacement capabilities. For example, Hamming codes can be used to correct errors, and duplication may be used to replace errors. While Hamming codes can be used to correct errors, they can become costly as the number of bits to correct increases. Likewise, while duplication can be a reliable method of data recovery, it, too, can be a very costly mechanism since it entails storing multiple copies of all data. For example, if one bit is stored in memory, two bits of the same value are stored in the cache. If an error is detected in one copy, the copy is thrown away, and the other copy may be used.

Another mechanism that can be used is similar to a redundant array of individual disks (RAID) approach. This mechanism is a disk drive arrangement that uses a parity drive. Thus, if there are n drives, the n+1 drive is a parity of the other n. Analogously, a cache memory can be segregated into n slices, and the RAID approach would require an n+1 slice to be a parity of the other n slices. Like data duplication, this method of data recovery is a very costly mechanism, in addition to being logically complex.

In embodiments of the invention, dirty data duplication is used to duplicate dirty cache lines only, as opposed to duplication of all cache lines. Dirty data duplication is effective under the presumption that the chances of multiple copies of the dirty data becoming corrupt in the cache are much lower than the chances of only a single copy becoming corrupt in the cache.

Caching

When an instruction to write data to a cached memory location is received, the data is written to a plurality of associated cache lines. In described embodiments, a four way set-associative cache is used whereby a single memory location may be indexed to any one of four cache lines in the cache. Furthermore, in described embodiments, data is duplicated to two cache lines.

However, the invention is not limited to any particular number of duplicated cache lines, except that the number of cache lines is greater than one. Moreover, the invention is not limited to a four way set-associative cache, nor is it limited to a set-associative cache. For instance, embodiments of the invention may be described with respect to a two way set-associative cache.

Illustrative Cache Line

As illustrated in FIG. 1, a cache line Cx 100, where x is a descriptive cache line number, comprises a valid bit 102, state bits 104, a tag address 106, data 108, and checkbits 110. The valid bit is used to determine the content of the data. If the data is valid, it may be clean data or dirty data, and if it is invalid, it may be used to store data. Since clean data matches data in the corresponding memory location, and thus may be overwritten (while dirty data should never be overwritten since it is a different and more recent copy than what is stored in main memory), a valid bit indicates that the data contained in the cache line should at least be considered, whereas an invalid bit indicates that the line can be used without consideration. As used herein, both clean cache lines and invalid cache lines are considered to be available cache lines.

The state bits are used to determine the type of data stored in the cache line. For instance, the state of the data may be clean or dirty. While other states may exist, they are omitted from discussion herein so as to not obscure the invention at hand. The tag address comprises the memory location to which the data corresponds, and the checkbits comprise bits for error detection. If the checkbits detect an error, then the data is said to be corrupt; otherwise, the data is uncorrupt.

Associated Set and Duplicates

An associated set is a set of n cache lines, where n is the number corresponding to an n-way set-associative cache. As each cached memory location corresponds to any one of n lines in an n-way set-associative cache, the n lines are considered to be part of an associated set. Thus, in described embodiments where four way set-associative caches are illustrated, a given memory location corresponds to an associated set comprising four cache lines. Cache lines within an associated set are associated cache lines, and cache lines corresponding to the same memory location are duplicates.

Available Cache Lines

Available cache lines comprise those cache lines that are marked clean or invalid. This can be determined, for example, by examining the valid bit in the cache line to determine whether or not it is set, and within the valid bit, what the state of the data is. If no available cache lines exist, then write-back to memory occurs in accordance with a replacement policy to free up cache lines.

Caching Example

In a four way set-associative cache, all cache lines are associated with one another such that a memory location can map to any one of the four lines in the set, and can use any of the four lines in the set for duplication, assuming they are available.

Figure 2:
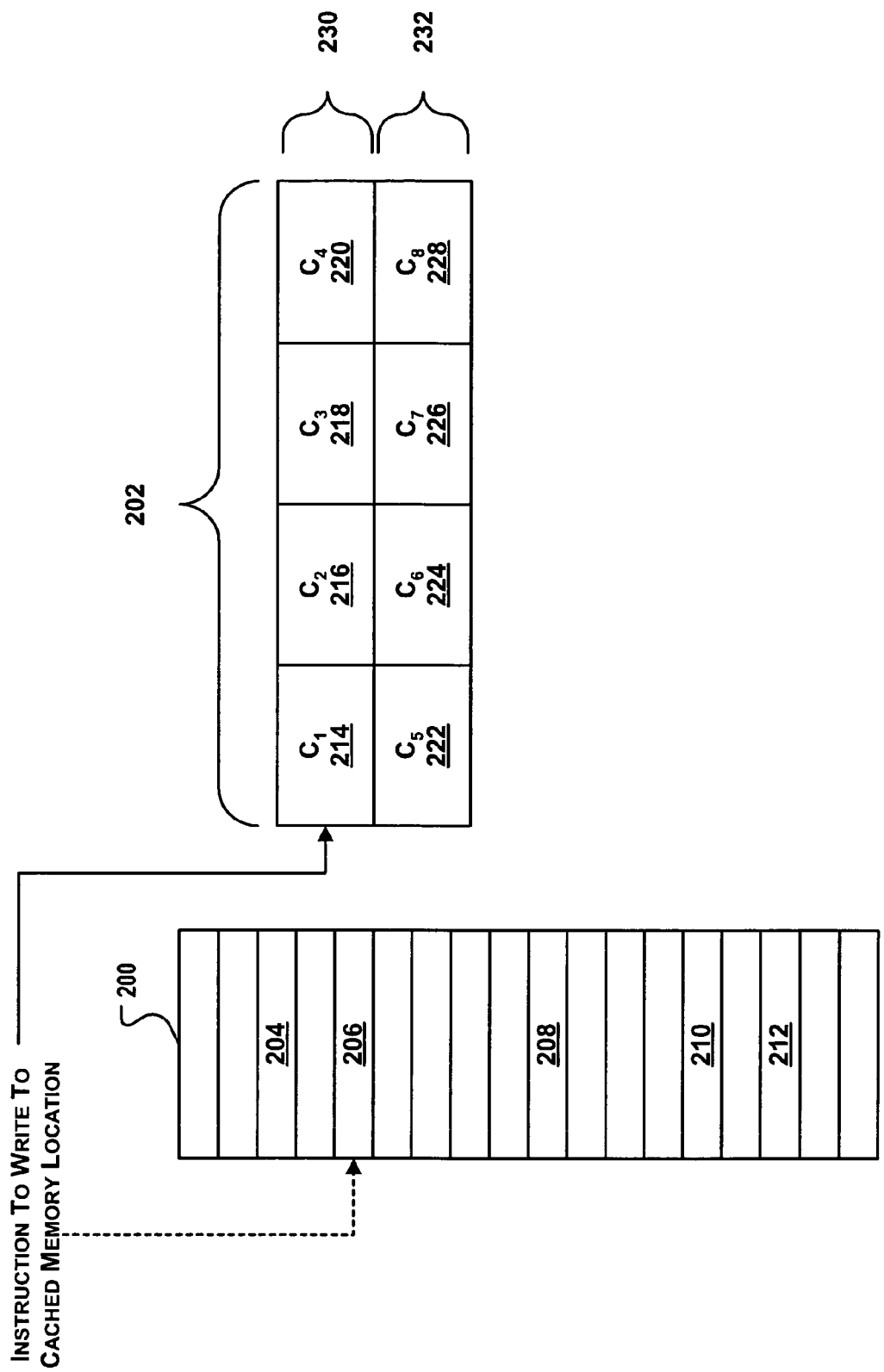
FIG. 2 is a block diagram illustrating a memory and cache system in accordance with embodiments of the invention.

A caching example in accordance with embodiments of the invention is illustrated in FIG. 2, where a memory 200 and a corresponding four way set associative cache 202 is illustrated. In this example, $C_1$ 214, $C_2$ 216, $C_3$ 218, and $C_4$ 220 are associated with one another in an associated set 230 (i.e., a given memory location can map to any one of $C_1$ 214, $C_2$ 216, $C_3$ 218, and $C_4$ 220), and $C_5$ 222, $C_6$ 224, $C_7$ 226, and $C_8$ 228 are associated with one another in an associated set 232. Within these sets, the following are some possible combinations:

- $C_1$ 214 is a duplicate of $C_2$ 216, and $C_3$ 218 is a duplicate of $C_4$ 220.
- $C_1$ 214 and $C_2$ 216 are clean lines, and $C_3$ 218 is a duplicate of $C_4$ 220.
- $C_1$ 214, $C_2$ 216 $C_3$ 218, and $C_4$ 220 are all clean lines.
- $C_5$ 222 is a duplicate of $C_6$ 224, and $C_7$ 226 and $C_8$ 228 are clean lines.
- $C_5$ 222 and $C_6$ 224 are clean lines, and $C_7$ 226 is a duplicate of $C_8$ 228.
- $C_5$ 222, $C_6$ 224, $C_7$ 226, $C_8$ 228 are all clean lines.

Of course, other combinations are possible, and are dynamic since the state of the lines (i.e., clean or dirty) may change during the course of cache reads and writes.

As an example, an instruction to write data to a memory 200 at a memory location that is cached 204, 206, 208, 210, 212 is received. Instead of writing the data to the memory location, it is written to two available cache lines 214–228 in an associated set 230, 232 of the corresponding cache 202. The two available cache lines in the set then become duplicates.

For example, if the core processor (as opposed to a general processor that typically includes the core processor and memory) receives an instruction to write data to memory location 206, and memory location 206 indexes to cache lines in associated set 230, then a cache controller could write to any two available cache lines in the associated set 230. Thus, if cache lines 214 and 216 are available, then the controller would write to those two cache lines. Furthermore, if no cache lines are available, the cache controller would invoke a replacement policy (to be discussed) to free up cache lines.

Figure 3:
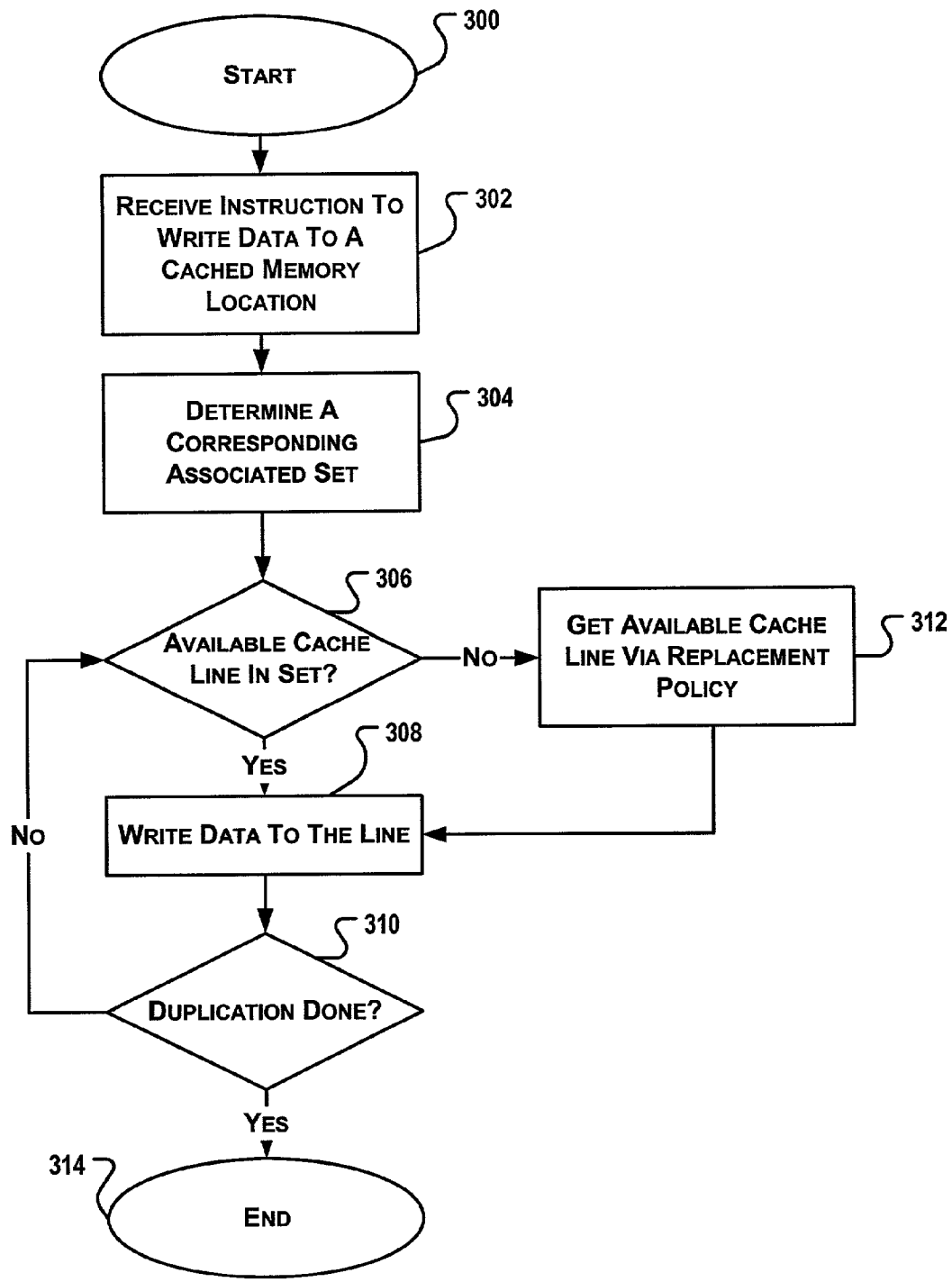
FIG. 3 is a flowchart illustrating a method for caching data in accordance with embodiments of the invention.

FIG. 3 is a flowchart illustrating a method in accordance with FIG. 2. It begins at block 300 and continues to block 302 where an instruction to write data to a cached memory location is received. At block 304, an associated set is determined. At block 306, it is determined if there is an available cache line in the associated set. If there is, then at block 308, data is written to that line. At block 310, it is determined if duplication is complete (i.e., if a given implementation is to write data to two cache lines, then duplication is complete when two cache lines are written to).

If duplication is not complete, then the method repeats at block 306. If no available cache line exists, then an available cache line must be found through a replacement policy (to be discussed), and when that line is found, data is written to that line back at block 308. If duplication is complete, then the method ends at block 314.

The method is not restricted to the order described. The method could be performed in a different order. For example, It could first be determined if all available cache lines exist before data is written, rather than writing data to an available cache line as it is found.

Write-Backs

Figure 4:
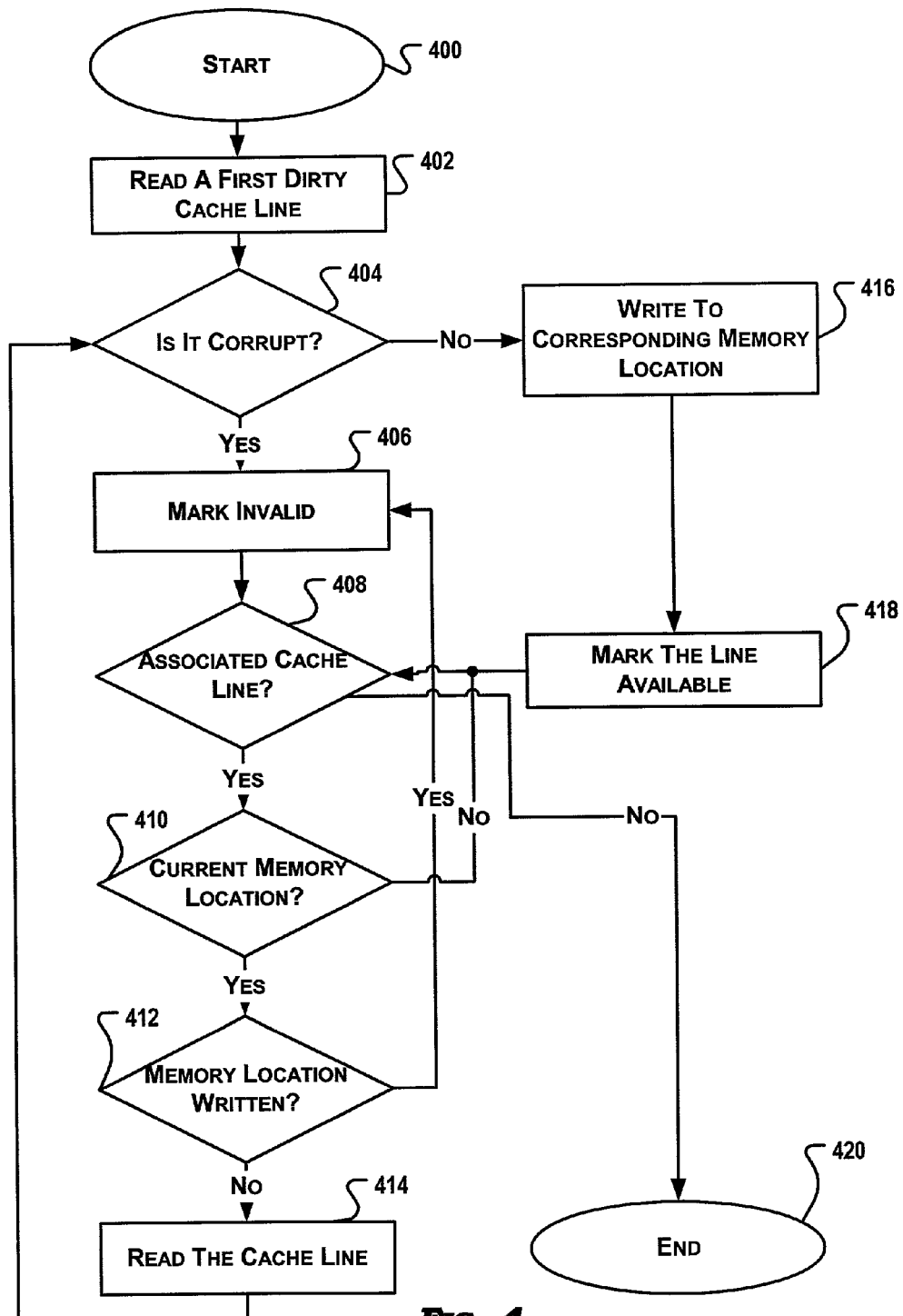
FIG. 4 is a flowchart illustrating a method for writing back selected dirty lines in accordance with embodiments of the invention.

Write-backs occur to save cache data to main memory. FIG. 4 is a flowchart illustrating a write-back operation within general embodiments of the invention. The method starts at block 400 and continues to block 402 where a first dirty cache line is read for writing back to memory. It is determined if the cache line is corrupt at block 404.

Cache line is not corrupt: If the line is not corrupt, then the cache line is written back to a corresponding memory location at block 416, as determined by the tag address of the cache line. At block 418, the cache line is marked available.

At blocks 408 and 410, an associated cache line corresponding to the current memory location is searched for. A current memory location comprises a memory location that has not been written to yet, where the memory location corresponds to a first read dirty line in an associated set. The current memory location gets reset when a memory location gets written to. Thus, if the first dirty cache line corresponds to a memory location A, memory location A is set as the current memory location. If an associated dirty cache line corresponds to a memory location B, then the associated cache line does not correspond to the current memory location. If an associated dirty cache line corresponds to a memory location A, then it corresponds to the current memory location.

If the associated cache line corresponds to the current memory location 410 and the current memory location has already been written to 412, then the associated cache line is marked invalid at block 406. This process is repeated until there are no more associated cache lines.

If the associated cache line corresponds to the current memory location 410 and the current memory location has not been written to 412, then at block 414, the data is read, and the method repeats at block 404 to determine if the data is corrupt.

If the associated cache line does not correspond to the current memory location 410, then another associated cache line is determined at block 408 until a cache line corresponding to the current memory location is found.

Cache line is corrupt: If the cache line is corrupt at block 404, then at block 406, the line is marked invalid, and available for use. At block 408, it is determined if an associated cache line exists, and at block 410 it is determined if the associated cache line corresponds to the current memory location. If it does, and if the memory location has not been written to, then the line is read at block 414 to determine if it is corrupt at block 404. If it is not corrupt, it is written to the current memory location at block 416, and the line is marked available at block 418.

Figure 5:
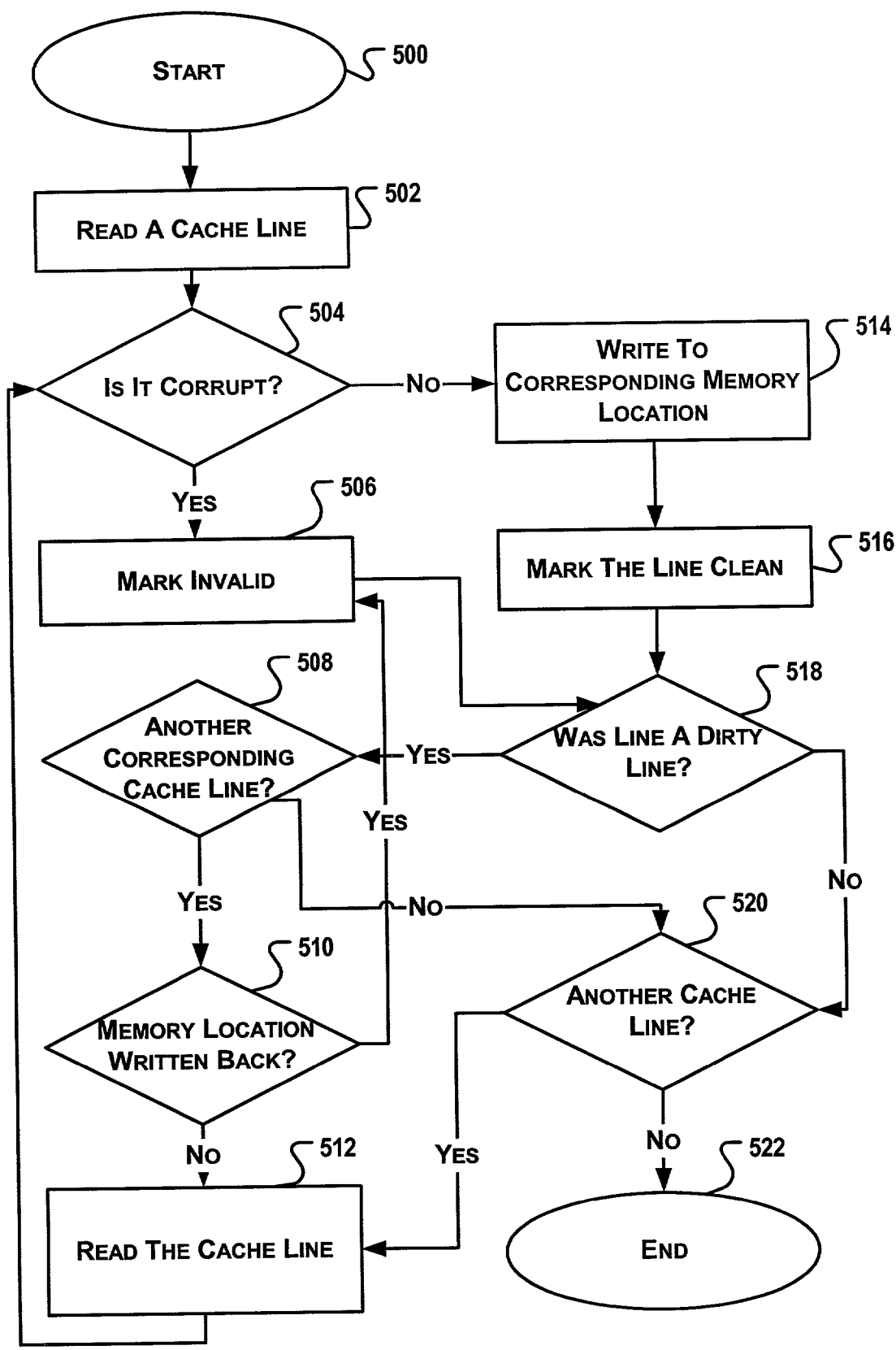
FIG. 5 is a flowchart illustrating a method for writing back cache lines in accordance with embodiments of the invention.

If the current memory location has been written to, then associated cache lines are found and marked invalid. (However, as illustrated in FIG. 5. even once a memory location has been written back to, corresponding cache lines may still be read to achieve a high confidence level that the data being written back is valid. Using this approach, the lines may be marked accordingly—i.e., if a line is not corrupt, it can be marked available—clean or dirty—and if a line is corrupt, it is marked invalid. While either implementation is within the scope of the invention, described embodiments use the former of these two implementations.) When no more associated cache lines exist, the method ends at block 420.

Replacement Policy

Write-backs may occur for any number of reasons as dictated by a replacement policy implemented for a given cache. A replacement policy is the policy that is used to identify cache lines to replace. A replacement policy may dictate that clean lines are replaced first; dirty lines are replaced first; all lines are replaced; younger lines are replaced first; or least recently used (LRU) lines are replaced first, for example.

Write-backs can occur, for example, on an as-needed basis when any number of dirty cache lines are freed up for a certain purpose; or for a context switch or a cache flush where all cache lines, clean and dirty, are written back, for example Thus, in a four way set-associative cache, each of the four lines in an associated set is read. Generally, if data on a cache line is not corrupt, it is written to memory and marked available, and if it is corrupt, it is not written to memory and marked invalid. The determination of whether an available line is marked clean or invalid is implementation and/or situation dependent.

If the line is a dirty line and the data is corrupt, it is marked invalid, and a duplicate line is searched for. This process is repeated until no more duplicate lines exist, or until a duplicate line having uncorrupt data is found. A duplicate line having uncorrupt data is written back and then marked available.

CONCLUSION

A mechanism has been described for writing data to and from a cache for cost-efficiently protecting dirty data. The mechanism can be implemented with little modification to existing cache architectures, and minimal modification to existing core processors. Error correction is extended to cover failures over a large number of bits without full duplication or the use of logically complex schemes such as the RAID approach.

Furthermore, the mechanism is congruent with existing methods of data recovery. For example, in an implementation where both dirty cache lines are read to achieve a high confidence of valid data, if the second cache line is corrupt, it can be scrubbed using the uncorrupt data from the first cache line. As another example, if one of the cache lines becomes permanently non-functional, the capability to run the cache in degraded mode means that the part of the cache containing the non-functional cache line may be ignored with the advantage that the first cache line is not functional, and may contain good data.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   reading data from a first dirty cache line in a cache memory;
   determining if the data within the first dirty cache line is corrupt;
   marking the first dirty cache line invalid if the data within the first dirty cache line is corrupt;
   determining if a duplicate cache line of the first dirty cache line exists, wherein duplicate cache lines are only created for dirty cache lines in the cache memory;
   if the duplicate cache line exists:
      writing data within the duplicate cache line to a first location in a memory if the data within the duplicate cache line is not corrupt; and
      marking the first dirty cache line available.

2. The method of claim 1, further comprising if the data from the first dirty cache line is not corrupt, then:
   writing the data from the first dirty cache line to the first location;
   marking the first dirty cache line available;
   determining one or more duplicate cache lines of the first dirty cache line; and
   marking each duplicate cache line as an available cache line.

3. The method of claim 1, further comprising marking the duplicate cache line invalid if the data within the duplicate cache line is corrupt.

4. The method of claim 3, further comprising:
   determining if one or more other duplicate cache lines of the first dirty cache line exist;
   determining if data within the one or more other duplicate cache lines is corrupt;
   writing the data within one of the other duplicate cache lines that is not corrupt to the first location; and
   marking the each of the other duplicate cache lines and the first dirty cache line as an available cache line.

5. The method of claim 1, further comprising determining that no duplicate cache lines exist.

6. The method of claim 5, further comprising terminating the method if a duplicate cache line does not exist.

7. The method of claim 1, further comprising if the duplicate cache line exists and if the data within the duplicate cache line is not corrupt:
   determining one or more other duplicate cache lines of the first dirty cache line; and
   marking each duplicate cache line as an available cache line.

8. The method of claim 1, further comprising invoking a replacement policy to free up one or more cache lines of the cache memory if there are no cache lines available.

9. An apparatus comprising:
   a cache memory; and
   a cache controller, coupled to the cache memory, to:
      receive a request to write data to a location within the cache memory;
      read data from a first dirty cache line in the cache memory in response to receiving the request;
      mark the first dirty cache line invalid if the data is corrupt;
      determine if a duplicate cache line of the first dirty cache line exists, wherein duplicate cache lines are only created for dirty cache lines in the cache memory;
      if the duplicate cache line exists:
         write data within the duplicate cache line to a first location in a main memory device if the duplicate cache line is not corrupt; and
         mark the first dirty cache line available.

10. The apparatus of claim 9, wherein the cache controller invokes a replacement policy to free up one or more cache lines of the cache memory if there are no cache lines available.

11. The apparatus of claim 9, wherein if the data from the first dirty cache line is not corrupt, the cache controller further operates to:
   write the data to the first location;
   mark the first dirty cache line available;
   determine at least one duplicate dirty cache line for the first dirty cache line; and
   mark each duplicate dirty cache line as an available cache line.

12. The apparatus of claim 9, further comprising marking the duplicate cache line invalid if the data within the duplicate cache line is corrupt.

13. The apparatus of claim 9, further comprising determining that no duplicate cache lines exist.

14. The apparatus of claim 9, further comprising if the duplicate cache line exists and if the data within the duplicate cache line is not corrupt:
  determining one or more other duplicate cache lines of the first dirty cache line; and
  marking each duplicate cache line as an available cache line.

15. The apparatus of claim 12, further comprising:
  determining if one or more other duplicate cache lines of the first dirty cache line exist;
  determining if data within the one or more other duplicate cache lines is corrupt;
  writing the data within one of the other duplicate cache lines that is not corrupt to the first location; and
  marking the each of the other duplicate cache lines and the first dirty cache line as an available cache line.

* * * * *